Oct. 15, 1968  O. JACOBEY  3,405,847
SCREW CONVEYOR
Filed Sept. 7, 1967
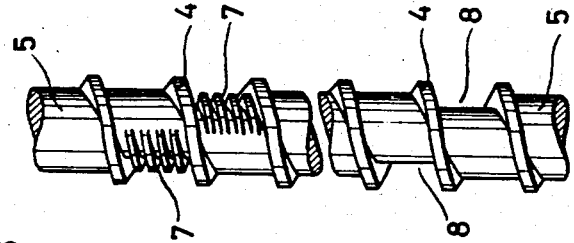
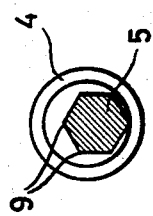
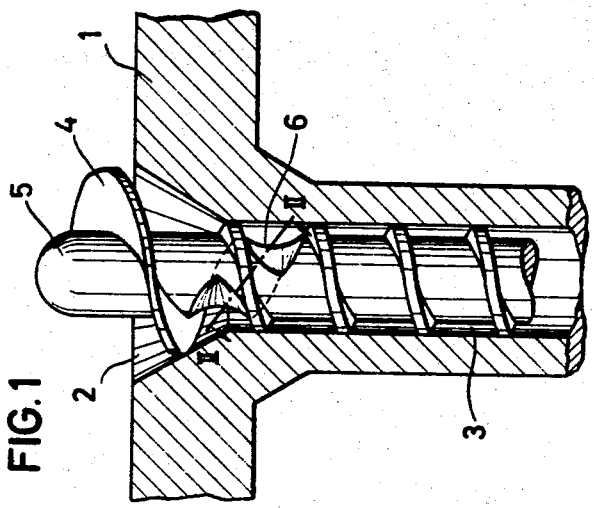
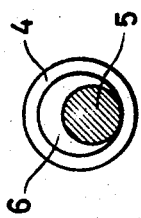
INVENTOR.
BY Olaf Jacobey
Bair, Freeman & Molinare

United States Patent Office 3,405,847
Patented Oct. 15, 1968

3,405,847
SCREW CONVEYOR
Olaf Jacobey, Dornigheim (Main), Germany, assignor to Vickers-Zimmer Aktiengesellschaft Planung und Bau von Industrieanlagen, a corporation of Germany
Filed Sept. 7, 1967, Ser. No. 666,072
Claims priority, application Germany, Sept. 10, 1966, V 31,912
10 Claims. (Cl. 222—412)

ABSTRACT OF THE DISCLOSURE

The specification discloses an improved conveyer worm or screw that is provided with a reduced diameter portion of about one spiral turn length of the shaft. The axis of the reduced diameter portion is off-center or eccentric with respect to the main axis of the shaft. The shaft is disposed within a housing of the type having an enlarged or conical inlet or feed zone and a straight bore such that the reduced diameter portion is positioned in the region communicating between the feed zone and bore, this region being termed a draw-in zone. Various modifications of the worm are disclosed in which the reduced diameter portion is formed by a single or a plurality of grooves having flat or arcuate (concave) bottoms or having edges between flats. The screw is particularly useful for conveying high viscosity plastic melts such as "Dacron" from vacuum vessels without break-off of material flow. As well as continuous flow, the worm permits high pressure conveying, better mixing and kneading action, damming-up of leakage flow, and is an overall shorter device simpler to construct than prior art tapered worm devices.

The field

The invention relates to a worm-conveyer device or extruder for the continuous discharge of highly viscous polymer melts from containers by a single-thread or multi-thread worm disposed in a worm casing or housing of the type having an expanded inlet part.

Background problem and prior art

Worm-conveyer devices are frequently used for the continuous discharge of melts of linear high polymers from containers, for example out of vacuum containers. However, prior art worm-conveyer devices for this purpose can convey only melts of relatively low viscosity. In the case of melts of viscosities above approximately 6,000 poises, a breaking-off of the material flow occurs during the operating process with obvious, very disadvantageous effects.

Another known worm-conveyer device shown in U.S. Patent 2,805,627 has an inflow funnel in which is positioned a worm having a shaft constructed in conical or tapered fashion in the draw-in zone. In this device, the diameter of the worm shaft increases continuously from the conical entrance or feed section to within the constant diameter section of the cylindrical worm casing or bore. In this worm-conveyer device, it became evident, in particular during the discharge of highly viscous melts out of a vacuum container, that a distinct return flow can occur which also results in breaking-off of the material flow.

Objects

It is among the objects of the invention to provide a worm-conveyer device of the kind having a conical inlet section and constant diameter bore section which avoids the above-mentioned disadvantages of such prior art devices.

It is another object to provide a worm-conveyer device that has a better conveying effect, an increased draw-in ability, and better condensing action, as well as a thorough mixing of the material to be processed.

The invention

According to this invention, these objects are achieved by constructing the worm shaft, in the area of the draw-in zone of the device, with a reduced diameter which is executed or disposed in eccentric fashion, as described in more detail below.

With the device of this invention, a continuous material flow is attained even where the material to be conveyed is of very high viscosity. The material is highly compressed in the conveying direction. Within the spiral a thorough mixing of the material takes place both in the conveying direction as well as diagonal to the conveying direction. Depending on construction and set-up or disposition of the eccentricity, the pressing, mixing and conveying functions of the device can be combined as desired. An increase in the pressure flow in proportion to the tow- or back-flow results whereby the breaking-off of the material flow, hitherto occurring in particular at the transition point between the inlet part and the cylindrical part of the worm housing, is prevented. A further advantage of the new device is a result of a high damming-up of leakage flow in the cylindrical part of the worm housing, thereby permitting in a shortening of the compression zone of the device so that the device can be constructed altogether shorter than conventional worm-conveyer devices.

In one embodiment of the device, the reduced diameter and the eccentricity of the worm shaft are formed by a groove disposed between the worm flights, preferably occupying the entire width of the spiral, i.e., the length of the shaft between adjacent worm flights. It is especially advantageous for mixing if the bottom of the groove is arched or arcuate in shape. Because of such shape, whirling or rotation of the material conveyed occurs in the area of the eccentrically constructed worm shaft. The rotational effect as a rule is desired and depends upon the consistency of the material to be conveyed.

Another embodiment is provided by the reduced diameter and the eccentricity of the worm shaft being formed by several spiral-like grooves disposed in the worm shaft between the worm flights. The angle of inclination of the spiral-like grooves can correspond to the angle of inclination or pitch of the worm flights.

As a still further embodiment of the invention, that segment of the worm shaft having a reduced diameter and an eccentricity can be provided with edges. Because of such edges, an increased kneading effect can be attained, if desired.

In addition to the above-specified advantages, the worm-conveyer device of this invention has the further advantage of being relatively simple to produce, and thus the cost of the entire device can be noticeably reduced.

The invention is explained in more detail by reference to the embodiments shown in the following drawings. There are shown in:

FIGURE 1, a longitudinal view, partly in section, of the draw-in zone of a worm-conveyer device;

FIGURE 2, a cross section through the worm of FIGURE 1 along the line II—II;

FIGURE 3, a second embodiment of a worm in which the draw-in zone portion has a plurality of spiral-like grooves between the worm flights;

FIGURE 4, a third embodiment of a worm in which the draw-in zone portion has a reduced diameter and eccentrically constructed shaft; and FIGURE 5, a fourth embodiment in a cross section, taken as along line II—II of FIGURE 1, through a worm shaft constructed with edges in the draw-in zone portion.

In FIGURE 1, the draw-in zone of a vertically arranged worm-conveyer device is shown as a longitudinal view, partly in section. This worm-conveyer device can, for example, be used in the continuous production of polyester wherein polycondensation of diglycol terephthalate takes place in heated containers under vacuum. In this case the polycondensate formed has to be conveyed continuously out of the containers and fed to the spinning system or to the succeeding polycondensation devices under pressure.

The worm housing 1 has a conical or funnel-shaped inlet 2 into which the melt to be conveyed or carried out is led, and a constant-diameter cylindrical part or bore 3 through which the material to be transported is passed. The melt itself is gripped by the worm and transported into the worm housing 1 in the direction of the discharge end. Flight 4 of the worm possesses in the funnel-like inlet zone 2 an increasing radius (considered from the bottom to top of the funnel) in such a manner that it reaches the wall of the funnel.

Approximately at the passage between the funnel-like inlet 2 of the worm casing 1 and its cylindrical bore 3, the shaft 5 of the worm is, according to the invention, provided with reduced diameter and constructed eccentrically. By such construction the especially advantageous draw-in conditions for the material to be transported are created. The decrease of the diameter of the worm shaft 5 and its eccentric construction or orientation are attained in simple manner through the provision of a groove 6 which extends over the entire width of the spiral and is led around shaft 5 approximately one time. In this embodiment, groove 6 is provided with a bottom arched in concave fashion.

In FIGURE 2, a cross-sectional view of the shaft 5 along line II—II of FIGURE 1 is shown. From this figure the eccentric position of the shaft segment can be clearly recognized. Groove 6 disposed in shaft 5 has approximately the shape of a moon-crescent.

FIGURE 3 shows only the worm shaft portion located in the draw-in area between the funnel-shaped inlet 2 and the cylindrical portion 3 of the worm housing 1. This part is provided with several spiral-like grooves 7 disposed in worm shaft 5 between the worm flights 4. By means of these grooves 7, shaft 5 likewise has an eccentricity and its diameter is reduced in the same manner as in the example according to FIGURE 1. According to the kind and consistency of the high polymer to be conveyed, the shape of the worm shaft is provided with one or several grooves.

FIGURE 4 shows a further embodiment of worm shaft 5 in which the groove 8 is constructed with a bottom parallel to the worm axis and occupies the entire width between the worm flight 4. With this embodiment, a particularly good fulling effect is attained.

FIGURE 5 shows another embodiment of a worm shaft 5, corresponding to a cross section along a line II—II of FIGURE 1, with reduced diameter and eccentric construction, wherein the portion of the worm shaft 5 provided with a reduced diameter is provided with edges 9 for attaining a kneading effect.

The worm-conveyer device according to the invention is by no means limited to an application for conveying high polymers out of evacuated containers; rather it can be successfully employed at all places where viscous media, or media of pasty or granular consistency, have to be drawn out of containers and forwarded.

I claim:

1. In a conveyer device of the type comprising a housing having an enlarged inlet portion communicating with a cylindrical bore, and a worm having a shaft and worm flights disposed with its axis coaxial with said bore and extending into said enlarged inlet portion, the region of communication between said bore and said inlet portion defining a draw-in zone, the improvement comprising the worm shaft having a reduced diameter portion the axis of which is eccentric to the axis of the shaft, said eccentric reduced diameter portion being disposed on that portion of the shaft within the draw-in zone.

2. A conveyer device of claim 1 wherein said eccentric reduced diameter portion is formed by a groove concave in cross section.

3. A conveyer device of claim 2 wherein said groove occupies the length of the shaft between adjacent worm flights and extends spirally around said shaft for about one turn.

4. A conveyer device of claim 1 wherein said eccentric reduced diameter portion is formed by a plurality of axially spaced spiral grooves disposed between adjacent worm flights.

5. A conveyer device of claim 4 wherein said grooves are of the same pitch as said worm flights, said grooves being axially spaced a constant distance from each other and extend spirally around said shaft for about one turn.

6. A conveyer device of claim 1 wherein said eccentric reduced diameter portion is formed by a groove having a flat bottom.

7. A conveyer device of claim 6 wherein said groove extends substantially the length of the shaft between adjacent worm flights and extends spirallf around said shaft for about one turn.

8. A conveyer device of claim 1 wherein the eccentric reduced diameter portion of the shaft is provided with a plurality of axially parallel edges.

9. A conveyer device of claim 8 wherein the portions of said eccentric reduced diameter shaft which are disposed between said axially parallel edges are planar.

10. A conveyer device of claim 9 wherein said planar portions extend substantially the length of the shaft between adjacent worm flights, and are disposed spirally around said shaft for about one turn.

References Cited

UNITED STATES PATENTS 3,184,112  5/1965  Loeser _____ 222—413 X
3,368,724  2/1968  Peters et al. _____ 222—413

FOREIGN PATENTS 117,362  8/1943  Australia.

ROBERT B. REEVES, *Primary Examiner.*

H. S. LANE, *Assistant Examiner.*